United States Patent [19]
Kortzeborn et al.

[11] Patent Number: 5,370,715
[45] Date of Patent: Dec. 6, 1994

[54] WASTE DESTRUCTOR AND METHOD OF CONVERTING WASTES TO FLUID FUEL

[76] Inventors: Robert N. Kortzeborn, 185 Laurie Meadows Dr., Unit 273, San Mateo, Calif. 94403; William D. Gwinn, 8506 Terrace Dr., El Cerrito, Calif. 94530

[21] Appl. No.: 66,701

[22] Filed: Apr. 27, 1993

[51] Int. Cl.$^5$ ............................................. C07C 1/02
[52] U.S. Cl. .............................. 48/197 R; 48/99; 48/111; 48/197 A; 48/209; 252/373; 422/200
[58] Field of Search .................. 48/209, 197 R, 197 A, 48/202, 62 R, 73, 111, 87, 99; 252/373; 422/200; 518/702

[56] References Cited

U.S. PATENT DOCUMENTS

| | | | |
|---|---|---|---|
| 447,506 | 0/1891 | De Mill, Jr. | 202/106 |
| 1,278,180 | 9/1918 | McDonald | 48/213 |
| 1,495,776 | 5/1924 | Burdick | 48/210 |
| 2,094,946 | 10/1937 | Hubman | 48/202 |
| 2,203,137 | 6/1940 | Freeman | 48/99 |
| 3,875,077 | 4/1975 | Sanga | 252/425 |
| 3,890,111 | 6/1975 | Knudsen | 48/197 R |
| 3,920,417 | 11/1975 | Fernandes | 48/197 R |
| 4,029,481 | 6/1977 | Oliver et al. | 48/111 |
| 4,095,960 | 6/1978 | Schuhmann | 48/197 R |
| 4,134,738 | 1/1979 | Bress et al. | 48/87 X |
| 4,195,978 | 4/1980 | Anderson | 48/87 X |
| 4,306,506 | 12/1981 | Rotter | 110/229 |
| 4,321,877 | 3/1982 | Schmidt et al. | 110/186 |
| 4,453,949 | 6/1984 | Fasching et al. | 48/87 X |
| 4,688,495 | 8/1987 | Galloway | 110/250 |
| 4,861,347 | 8/1989 | Szydlowski et al. | 422/200 X |
| 4,872,886 | 10/1989 | Henley et al. | 48/209 X |
| 4,874,587 | 10/1989 | Galloway | 422/189 |
| 4,909,809 | 3/1990 | Ohsaki et al. | 422/200 X |
| 5,106,390 | 4/1992 | Beierle et al. | 48/197 |
| 5,226,281 | 7/1993 | Kao et al. | 422/200 X |
| 5,226,927 | 7/1993 | Rundstrom | 48/111 X |

OTHER PUBLICATIONS

Phoenix Technolgoies Corp.; "The Viking System"; undated four page brochure; first distributed Dec. 9, 1991.

*Primary Examiner*—Robert J. Warden
*Assistant Examiner*—Robert Carpenter
*Attorney, Agent, or Firm*—Harris Zimmerman

[57] ABSTRACT

Organic wastes of diverse types including toxic materials are converted to synthesis gas or molecular hydrogen or methanol and an inorganic solid residue by heating the material to 1200 ° C. or higher in the presence of steam in a chemically reducing atmosphere. The gassified wastes travel along a vertical flow path in a sealed reactor vessel. Heat is applied by vertically extending recuprative heaters situated at both lower and upper regions along the flow path to provide a high temperature zone of sufficient length to thermally decompose the wastes during a single passage along the path. Steam may be provided by intermixing liquid water, which may be dirty and/or contaminated, into the wastes prior to entry of the wastes into the reaction chamber thereby avoiding any need for an external boiler and pure water. The apparatus realizes a very high throughput and does not release any pollutants into the air, ground or water.

38 Claims, 6 Drawing Sheets

FIG_1

FIG_3

FIG_6

FIG_7

FIG_8

FIG_9

WASTE DESTRUCTOR AND METHOD OF CONVERTING WASTES TO FLUID FUEL

TECHNICAL FIELD

This invention relates to the processing of waste materials and more particularly to methods and apparatus for converting carbon containing wastes into usable fluid fuels and inorganic residue.

BACKGROUND OF THE INVENTION

Modern technology and an enlarging human population have combined to produce an ever increasing volume of waste material. Much of this material is composed of organic or carbonaceous substances which do not decompose quickly by natural processes. The growing accumulation of waste materials has created extremely serious problems.

Existing landfill or dump sites are rapidly filling. Creation of new dump sites requires additional land that should preferably be put to other uses or be preserved in its natural state. Environmental concerns create further complications. Dump sites and wastes processing operations can be a major source of air and water pollution. Some wastes are toxic or infectious and thus cannot be disposed of in the same manner as other garbage.

Cost considerations have prevented update and expansion of sewage treating facilities to meet the needs of the growing populations of many communities. This has created serious health hazards in many areas.

Some waste materials can be burned but this releases pollutants into the atmosphere regardless of how carefully the incinerator products are scrubbed before being released.

Certain organic materials can be decomposed and be converted to useful synthesis gases by known gasification processes. For instance, when coal is heated out of contact with air it is resolved into the stable solid residue known as coke and a volatile matter, the principal constituent of which is coal gas. The coke residue may be gasified in steam to make water gas. Coal gas and mixtures of coal gas and water gas have been used extensively as a public or industrial fuel. A lower order gas, known as producer gas, can be made by blowing air or a mixture of air and steam through a deep hot bed of coal.

Gasification of organic materials by the above described known processes produces and releases pollutants. Many such processes also produce tars and other undesirable volatiles that degrade the quality of the synthesis gas and also foul the equipment that is used to produce the gas. The processes oxidize a considerable amount of the carbon in the feedstock into carbon dioxide which is not combustible and which therefore lowers the energy content of the synthesis gas.

Synthesis gas produced by the prior processes can be converted to methanol, a combustible liquid fuel, by known techniques. Methanol produced by the prior processes tends to be contaminated with water owing to impurities in the gas.

It has previously been recognized that a variety of organic waste materials can be decomposed without pollutant production and that a fuel gas of higher energy content can be produced by performing a gasification process in a high temperature, chemically reducing atmosphere. The reactor chamber is sealed to exclude air and thus free oxygen from the reaction and superheated steam is injected into the chamber. Chemical elements in such an atmosphere are reduced to a lower oxidation state as opposed to the oxidizing processes which occur in earlier forms of gasifier. Organic compounds in the feedstock, including toxic substances, are decomposed and the products of the reaction are a very high quality synthesis gas and a residue of inorganic salts.

Prior waste gasifiers which operate with a reducing atmosphere have characteristics which variously limit throughput or result in undesirably high operating costs. Some require refluxing or repeated passages of the waste material through a high temperature zone in order to fully decompose the material. Others require a high input of electrical energy from an external source for the purpose of operating electrical heaters. Some are not readily adaptable to the processing of a variety of different waste materials. The prior waste gasifiers require large amounts of water for the boilers which supply steam to the reaction chamber. This would produce an excessive amount of boiler scale in a high volume waste processor and, as a practical matter, it would be necessary to provide costly distilled or deionized water to such a waste processor using the prior technology.

The present invention is directed to overcoming one or more of the problems discussed above.

SUMMARY OF THE INVENTION

In one aspect, the present invention provides apparatus for destroying carbonaceous waste materials by conversion of the materials to combustible gas and inorganic residue. The apparatus includes a reactor vessel with an internal reaction chamber which forms a vertically extending flow path and which has a feedstock inlet port and a gas outlet port. Further components include means for directing a flow of the waste material into the chamber, means for creating a chemical reducing atmosphere in the reaction chamber by inhibiting entry of oxygen gas into the chamber and means for heating the contents of the chamber. The heating means includes a plurality of recuprative fuel burning heaters which exhaust the combustion products of the burning fuel at locations which are outside of the reaction chamber. The heaters have heat transfer surfaces situated within the reaction chamber at the flow path. The heat transfer surfaces transfer heat to the contents of the reactor at a plurality of locations along the flow path to provide a vertically extended high temperature waste decomposition zone within the reactor vessel.

In another aspect of the invention, apparatus for destroying carbonaceous waste materials by conversion of the materials to combustible gas and inorganic residue includes a reactor vessel with an internal reaction chamber which forms a waste material flow path and which has a feedstock inlet port and gas outlet port. Further components include means for directing a flow of the waste material into the reaction chamber through the inlet port, means for inhibiting entry of oxygen gas into the chamber and heating means for heating the contents of the chamber in the presence of steam. The apparatus further includes means for producing the steam by injecting a flow of liquid water into the waste material prior to entry of the waste material into the reaction chamber.

In another aspect, a method for converting carbonaceous waste materials into combustible gas and inorganic residue includes the step of directing a flow of the material along a vertical flow path in a sealed chamber while subjecting the flow to a high temperature chemically reducing atmosphere in the presence of steam. Further steps include burning fuel in recuperative fuel burners within the reaction chamber to produce the high temperature while isolating the waste material from the burning fuel and the combustion products produced by the burning fuel. Heat produced by the burning fuel is directly transferred to the flow of waste material within the chamber at a lower region of the flow path and also at a higher region to provide a waste decomposition zone along the path that is long enough to decompose the material during a single passage along the flow path.

In still another aspect of the invention, a method for converting carbonaceous waste materials into combustible gas and inorganic residue includes the step of directing a flow of the waste material along a flow path within a sealed reaction chamber while subjecting the flow to a high temperature chemically reducing atmosphere in the presence of steam. The steam is produced by intermixing the waste material with liquid water prior to entry of the waste material into the reaction chamber.

The invention rapidly and efficiently decomposes diverse different types of organic wastes in a cost effective manner without releasing any pollutants into the air, ground or water. The only products of the reaction are high quality combustible gas or liquid fuel and a small residue of granulated inorganic salts. A continuous flow of waste material may be fed into the reactor and decomposition occurs without refluxing of the material as recuperative heaters are situated within the reactor and are arranged to create a thermal decomposition zone having a length sufficient to cause complete decomposition of the waste material during a single passage of the material along the zone. In the preferred form of the invention, a portion of the gas that is produced by the reactor is used to fuel the heaters. Thus input of energy from an external source for the purpose of operating the heaters is not required after an initial heating of the reaction chamber to the operating temperature. The steam which is required for the reaction is produced by injecting liquid water into the flow of waste material prior to entry of the material into the high temperature reaction zone. Thus external boilers are not needed and dirty or contaminated water may be used. The system is preferably provided with temperature and pressure sensors and gas composition detectors at key locations to enable continual monitoring of process conditions. This enables adjustment of flow rates, temperatures and the like to accommodate to different feedstocks and different operating conditions or to vary the composition of the output gas. Monitoring and adjusting of the system may be controlled by an on-line digital computer.

The invention, together with further aspects and advantages thereof, may be further understood by reference to the following description of the preferred embodiment and by reference to the accompanying drawings.

DETAILED DESCRIPTION OF THE PREFERRED EMBODIMENTS

Figure 1:
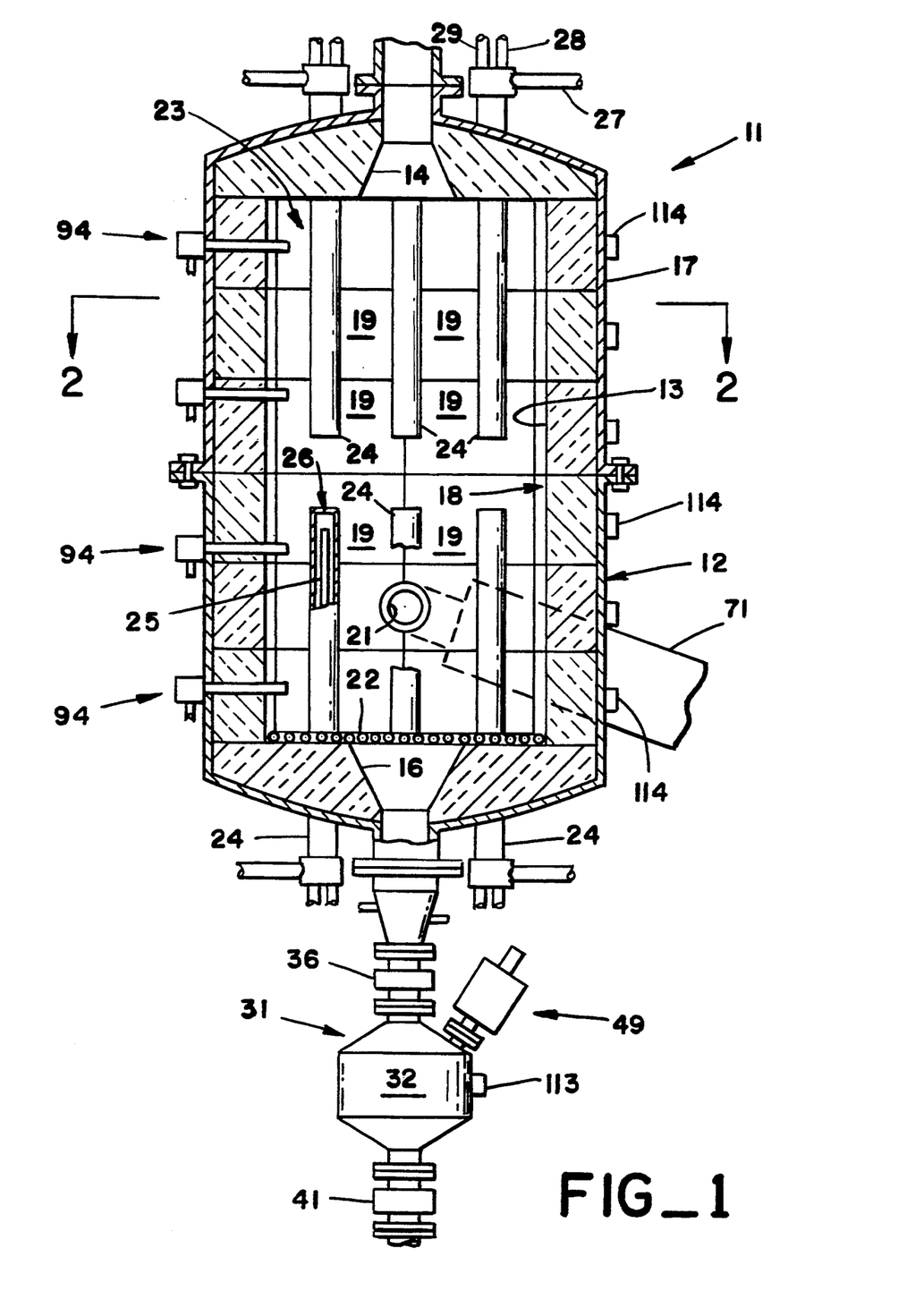
FIG. 1 is an elevation view, shown partially in section, of the reactor vessel of waste destructor apparatus embodying the invention.
Figures 2, 4, 5:
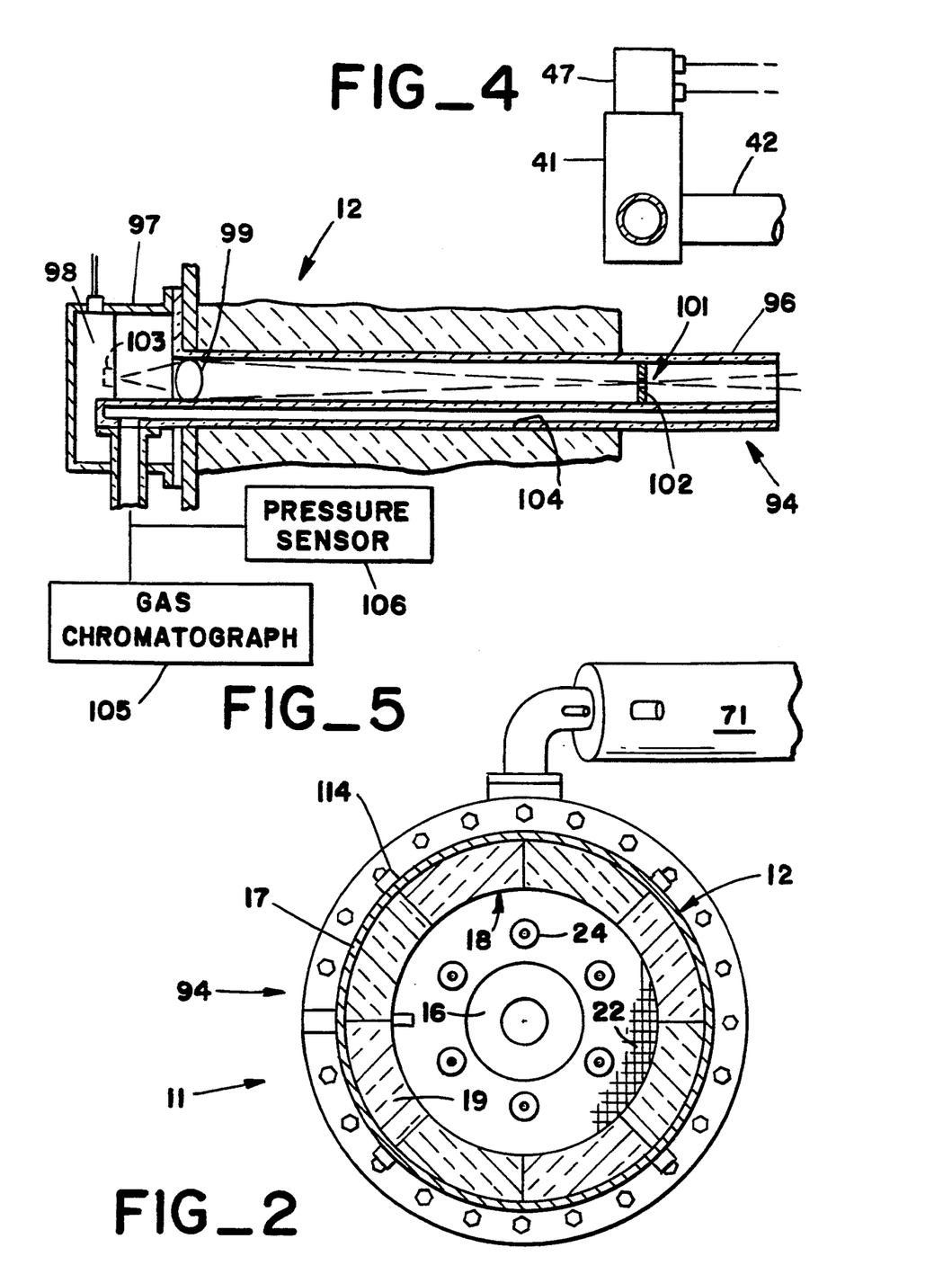
FIG. 2 is a cross section view of the reactor vessel of FIG. 1 taken along line 2—2 thereof.
FIG. 4 is a cross section view taken along line 4—4 of FIG. 3.
FIG. 5 is an axial section view of a temperature, pressure and gas composition sensor probe which monitors process conditions within the reactor vessel.

Referring initially to FIGS. 1 and 2 of the drawings in conjunction the waste destructor 11 includes a reactor vessel 12 having an internal reaction chamber 13 which extends vertically between a gas outlet port 14 at the top of the chamber and an ash outlet port 16 at the base of the chamber. Vessel 12 may have a steel outer shell 17 and a thick inner lining 18 of refractory material. Lining 18 is preferably formed of discrete blocks 19 of the refractory material as a segmented construction of this kind is less susceptible to cracking by thermally induced stresses.

Solid components of the waste which is to be processed are chopped into small pieces, which may typically have dimensions of two inches or less, prior to entry of the wastes into the reactor vessel 12. The waste feedstock enters chamber 13 through a feedstock inlet port 21 which is in the lower part of the side wall of vessel 12 at a location which is spaced above the base of the chamber. Solid pieces of the feedstock may drop down towards the grate 22 and be gasified during the process. Any remaining solid pieces of feedstock are held on the porous grate 22 at the base of chamber 13 and are quickly gasified by heat and steam produced by components that will hereinafter be described.

Gasification of the feedstock is brought about by heating means 23 for heating the contents of chamber 13. The heating means 23 includes a plurality of heaters 24 which are of the gas burning type. This enables use of a portion of the fuel gas output of the reactor vessel 13 for heating the contents of the vessel itself. Heaters 24 are also of the recuperative type which have an elongated burner element 25 that extends along the axis of a gas impervious housing 26 and which do not release the products of combustion of the burnt fuel into the heated region. Such combustion products are vented at a location which is outside of the vessel 13 through exhaust ducts 27. Fuel and air inlets, 28 and 29 respectively, also connect to ends of the housings 26 which protrude from the outer surface of vessel 13. Recuperative heaters of this kind are known to the art and are available commercially.

Heater housings 26 have an elongated cylindrical configuration and in the present apparatus the heaters extend vertically in parallel relationship with the side wall of chamber 13. An upper group of six heaters 24 extend down from the top of vessel 12 into the upper region of chamber 13 and are spaced apart and situated at equiangular intervals around the vertical centerline of the vessel. A lower group of six heaters 24 extend upward from the bottom of vessel 13 into the lower region of chamber 13 and each such heater is aligned with and spaced apart from a separate one of the heaters of the upper group.

Gas produced by thermal decomposition and gasification of the feedstock flows upward alone a vertically directed path which extends into outlet port 14. The exterior surfaces of heater housings 26 are heat transfer surfaces which heat the contents of chamber 13. Owing to the above described heater arrangement, heat is transferred to the upflowing gas at a plurality of locations along the gas flow path. This provides a maximum temperature zone within the gas flow path that is sufficiently extensive in the vertical direction to enable complete conversion of the upflowing matter into the desired fuel gas and residue salts during a single passage along the flow path.

Heaters 24 preferably have sufficient capacity to maintain a temperature of at least about 1200° Celsius within the the extended maximum temperature zone as the desired chemical reactions occur at a very fast rate at or above this temperature.

Figure 3:
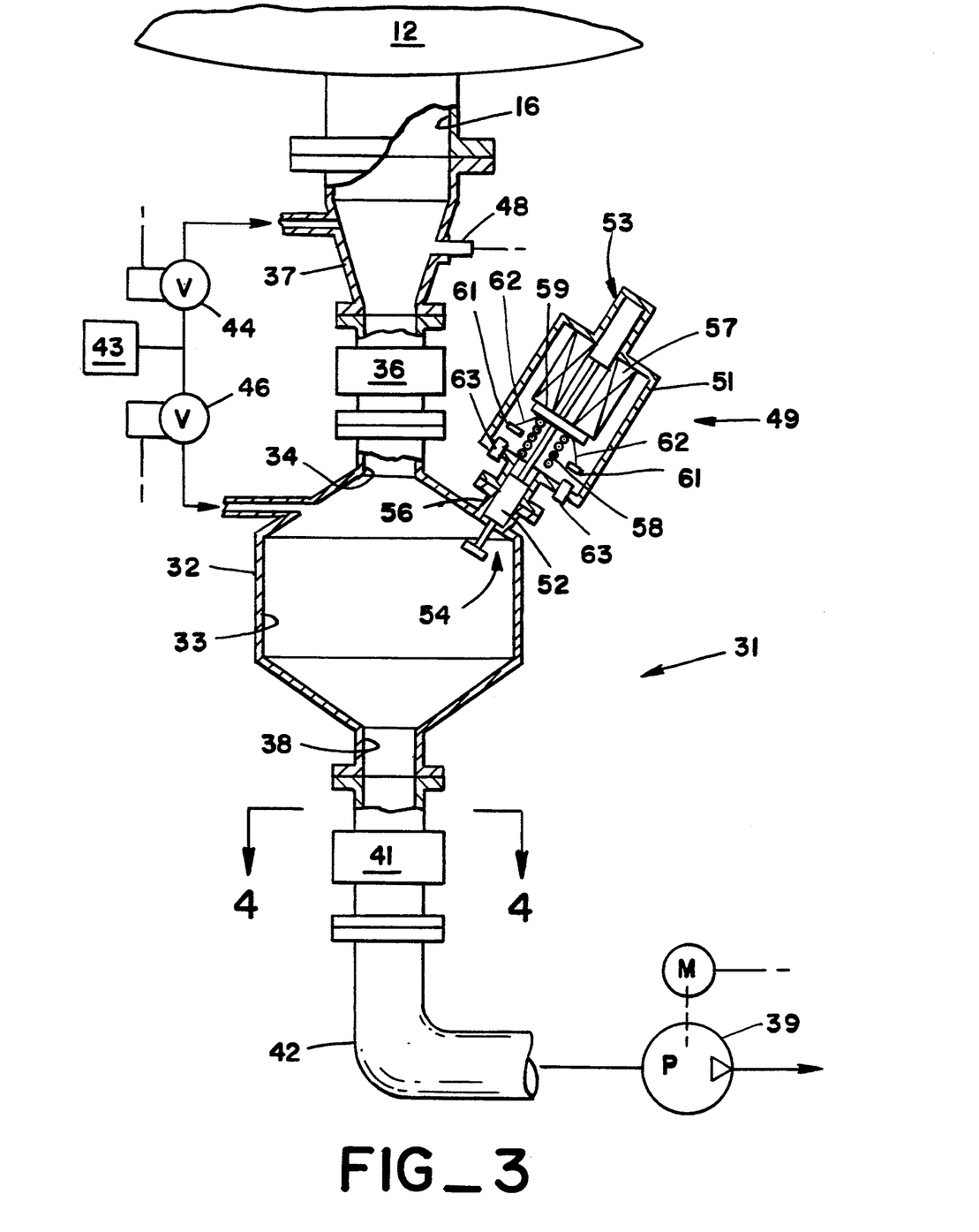
FIG. 3 is a broken out elevation view of the ash remover component of the waste destructor.

An ash remover 31 enables periodic removal of the granulated solid residues that are produced by the reaction without allowing atmospheric oxygen to enter chamber 13 in the process. Referring now to FIG. 3, the ash remover has a primary housing 32 with an internal chamber 33 in which the residues are received and temporarily stored. Housing 32 has an inlet opening 34 at the top which is communicated with ash outlet port 16 of vessel 12 though an upper valve 36 and a tapered ash conduit 37. An ash outlet opening 38 at the base of housing 32 is communicated with an ash removal pump 39 through a lower valve 41 and pipe 42. Water from a water supply 43 may be directed into the upper end region of ash conduit 37 through a first normally closed water valve 44 and may be directed into the upper region of housing 32 by opening a second normally closed water valve 46.

To enable control of the ash remover 31 from a remotely located control center, water valves 44 and 46 are of the known types, such as solenoid valves, which are actuated by electrical signals. Referring jointly to FIGS. 3 and 4, the upper and lower valves 36 and 41 are gate valves which also have actuators 47 of the known type that respond to electrical signals.

During operation, upper valve 36 is initially open and lower valve 41 is closed. Housing 32 and the lower region of ash conduit 37 are filled with water by temporarily opening valves 44 and 46. A water sensor 48 at the wall of ash conduit 37 transmits a signal to the control center when the water has risen to the level of the sensor and water valves 44 and 46 are then adjusted to maintain the water at that level. During the following operation of the waste destructor 11, the solid residues of the reaction drop into the ash remover housing 32.

An ash sensor 49 transmits an electrical signal to the control center when housing 32 has become largely filled with residues. The sensor 49 has a sub-housing 51 which is secured to the upper portion of housing 32 and which contains a slidable plunger 52 having an upper end 53 which is formed of ferromagnetic material and having a lower end 54 which extends into a sleeve 56 that opens into the interior of the housing 32. At the normal position of plunger 52, a small portion of the upper end 53 of the plunger extends into the upper end of an electrical solenoid coil 57 within sub-housing 51. Plunger 52 is biased towards that position by a helical compression spring 58 which bears against a flange 59 at the central region of the plunger.

Coil 57 is periodically energized during operation of the waste destructor 11 to draw upper end 53 of plunger 52 further into the coil. This causes a periodic insertion of the lower end 54 of the plunger 52 into the interior of housing 32. A pair of electrical contacts 61 are carried by conductive leaf springs 62 which are in turn secured to plunger flange 59. Contacts 61 contact and electrically connect a pair of electrical terminals 63 when plunger 52 reaches the point of maximum insertion into housing 32. Terminals 63 are electrically connected to the control center which will hereinafter be described and a signal is transmitted to the control center when plunger 52 reaches the point of maximum insertion into housing 32.

The signal is not transmitted when the accumulation of residue in housing 32 rises to a level at which it blocks full insertion of plunger 52. In response to the absence of the signal, upper valve 36 is closed, lower valve 41 is opened, ash removal pump 39 is actuated and water valve 46 is temporarily opened to flush the contents of chamber 32 into the pump in the form of a slurry. After a period of time sufficient to empty housing 32, valve 41 is closed, pump 39 is deactuated, valve 36 is reopened. Chamber 33 and the lower region of conduit 37 are refilled with water and the ash remover 31 is thereby conditioned for the subsequent cycle of operation. The chemical reaction within reactor vessel 12 is not interrupted during the residue removal operations.

Figure 6:
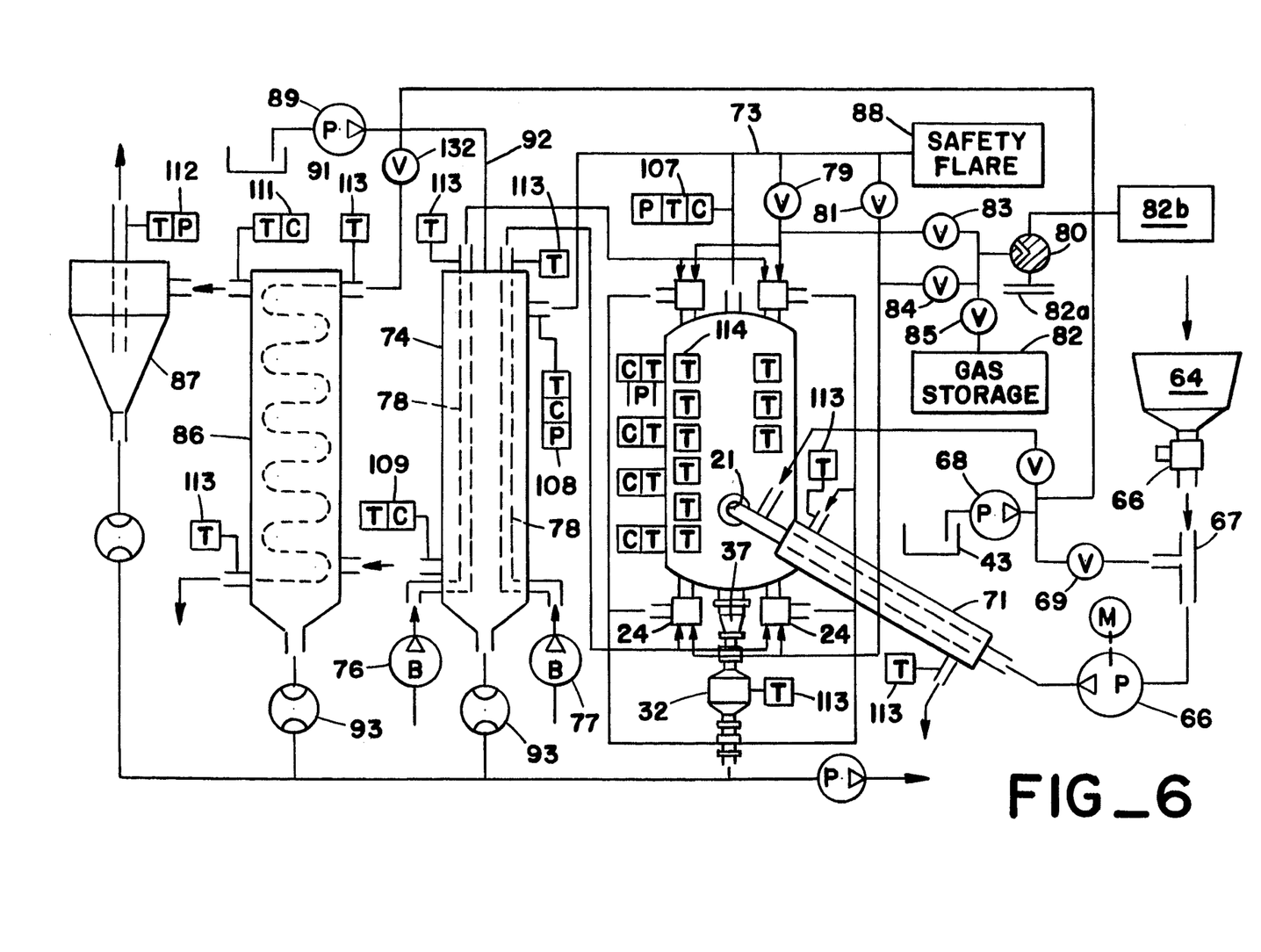
FIG. 6 a schematic depiction of the reactor vessel together with other components of the waste destructor apparatus.

Referring to FIG. 6, the waste material or feedstock which is to be processed may, if necessary, be chopped in the previously described manner and then be introduced into a hopper 64. Feedstock from hopper 64 is delivered to the intake of a slurry pump 66, which is of the known type that pumps liquid/solid mixtures, through an electrically actuated flow control valve 66 and flow conduit 67.

In order to provide the steam which is needed for the reaction to proceed within reactor vessel 12, a controlled flow of liquid water is intermixed with the feedstock as it travels through flow conduit 67. For this purpose, water from supply 43 is pressurized by a pump 68 and delivered to conduit 67 through another electrically actuated flow control valve 69. In contrast to prior waste destructors of this general type, which use external boilers to generate steam, the water need not be distilled or de-ionized and can in fact be dirty water or contaminated water. The amount of water which is needed is dependent on the constituents of the feedstock and can be determined empirically.

Slurry pump 66 delivers the flow of feedstock to inlet port 21 of the reactor vessel 12 through a first heat exchanger 71 which preheats the material, to a temperature of approximately 500° C. for example, prior to entry of the material into the reactor vessel. Heat is supplied to exchanger 71 by directing the hot exhaust gas from the previously described recuperative heaters 24 through the exchanger. At this high temperature, the gasification process is initiated prior to entry of the feedstock flow into reactor vessel inlet port 21. Fine control of the water content and thus the pressure within reactor vessel 12 is provided for by another flow control valve 72 through which pressurized water from pump 68 may be admitted into the feedstock inlet port 21.

The previously described water within ash flow conduit 37 at the base of reactor vessel 12 provides a second source of steam for the gasification process. This can greatly increase the efficiency of the process as the flow of newly produced synthesis gas within vessel 12 can otherwise inhibit contact of water molecules with surfaces of the feedstock in the lower region of the vessel and particularly at grate 22. Referring again to FIG. 1, this water source also acts to cool the ash remover 31 and the bottom region of the vessel 12 that is below grate 22.

Referring again to FIG. 6, the combustible gas which is produced within reactor vessel 12 flows into a duct 73 and then through a second heat exchanger 74 where it is initially utilized to heat the air that is supplied to heaters 24 as such heating increases the efficiency of the heaters. A first blower 76 supplies air to the heaters 24 which extend into the top of reactor vessel 12 and a second blower 77 supplies air to the heaters that extend up into the bottom of the reactor vessel. The output air conduits 78 of both blowers 76 and 77 extend within the second heat exchanger 74 in order to effect the desired heating of the air.

A portion of the combustible gas which is produced by the waste destructor 11 is used to fuel the heaters 24. For this purpose, another electrically actuated flow control valve 79 is used to transmit gas from duct 73 to the fuel inlets of the heaters 24 which are at the top of reactor vessel 12 and still another such flow control valve 81 transmits gas from the duct to the heaters at the bottom of the reactor vessel.

To provide gas to heaters 24 during start up of the system, gas which has been produced during a previous period of operation is stored in a pressurized tank 82 and may be selectively delivered to the top heaters 24 through another flow control valve 83 and to the bottom heaters through an additional flow control valve 84. Tank 82 may charged with fuel gas from an external source, in order to enable the initial start up of the system, by closing valves 83 and 84 and by setting a three way valve 80 to introduce gas from a utility natural gas line 82a or from a propane gas storage tank 82b. Alternately, storage tank 82 may be temporarily isolated from valves 83 and 84 by closing another valve 85 at the inlet/outlet port of the tank and three way valve 80 may be adjusted to supply either natural gas or propane directly to the burners 24 through valves 83 and 84.

Separate valves 79 and 81 and separate blowers 76 and 77 are provided for controlling air flow and fuel flow to the heaters 24 at the top and bottom of reactor vessel 12 to enable independent variation of the temperatures at the upper and lower regions of the vessel for purposes which will hereinafter be described.

The fuel gas flow from second heat exchanger 74 is cooled by passage through a third heat exchanger 86 and then passes through a cyclone separator 87 which removes any particulates that may remain in the flow. The output of separator 87 is a high quality fuel gas that may be used for any of the customary purposes.

The gas outlet duct 73 from reactor vessel 12 is communicated with a safety flare 88 of the known design in order to ignite, burn and release the gas in the event of an over-pressure or other potentially hazardous malfunction.

As will be further discussed, some modes of operation of the system may require the addition of additives into the outflow of fuel gas. Such additives may be sprayed into the top of the second heat exchanger 74. For this purpose another pump 89 draws the additive from a supply reservoir 91 and directs it into exchanger 74 through a conduit 92. Some additives may produce ash or granular residues. Rotary ash locks 93 are communicated with the bases of the second and third heat exchangers 74 and 86 and remove such ash in the known manner without enabling a release of gas from the exchangers or entry of gas into the exchangers.

Efficient control of the waste destructor 11 requires monitoring of temperatures, pressures and gas composition at certain key points in the system and such monitoring can also enable automatic adjustment of the system controls to accommodate to different feedstock compositions and different operating conditions. Referring again to FIG. 1, four vertically spaced sensor probes 94 extend through the side wall of reactor vessel 12 and monitor temperature and gas composition at each of four different levels along the gas flow path. Referring to FIG. 5, each such sensor probe 94 has a ceramic tube 96 which extends through a conforming passage in the side wall of vessel 12 and a circuit housing 97 secured to the end of the tub at the exterior of the vessel. A temperature sensor 98 in housing 97 views the interior of the reactor vessel 12 through a lens 99 and a central aperture 101 in an opaque disk 102 situated at the focal point of the lens. Sensors 98 may be of the known type which sense the intensity of the infrared energy which impinges on a phototransistor 103 or the like and which transmit an electrical voltage that is proportional to the infrared intensity.

A small gas pipe 104 within tube 96 delivers a flow of the gas from the interior of vessel 13 to a gas chromatograph 105 which may be of the known type that analyzes the chemical composition of the gas and which generates electrical signals indicative of such composition. At least one of the pipes 104 also communicates with a pressure sensor 106 which senses pressure in the vessel 13 and transmits a voltage indicative of the pressure.

Referring again to FIG. 6, efficient control of the reactor in response to changing conditions is further provided for by sensing temperature, pressure and/or gas composition at still other points in the system. Sensor probe 107 monitors temperature, pressure and gas composition in gas outlet duct 73. Sensor probe 108 monitors temperature and gas composition at the fuel gas inlet of second heat exchanger 74 and additional sensor probes 109 and 111 perform similar operations at the outlet of exchanger 74 and at the outlet of the third heat exchanger 86. Temperature and pressure of the gas output of the system is monitored by still another sensor probe 112 at the outlet of cyclone separator 87.

A series of thermocouples 113 monitor temperature only at a number of other points in the system. Such points include the inlet and outlet of the first heat exchanger 71 through which the heater exhaust gas flows, housing 32 of ash remover 31, the outlets through which the air flows from blowers 76 and 93 leave the second heat exchanger 74 and the water inlet and water outlet of the third heat exchanger 86.

An array of temperature signal generating thermocouples 114 monitor the temperature of the outer surface of reactor vessel 13 at spaced apart locations which are distributed around the outer surface. This enables detection of cracking or other failure of the refractory inner lining of the vessel as such cracking results in a hot spot which is detected by nearby ones of the thermocouples 114.

Figure 7:
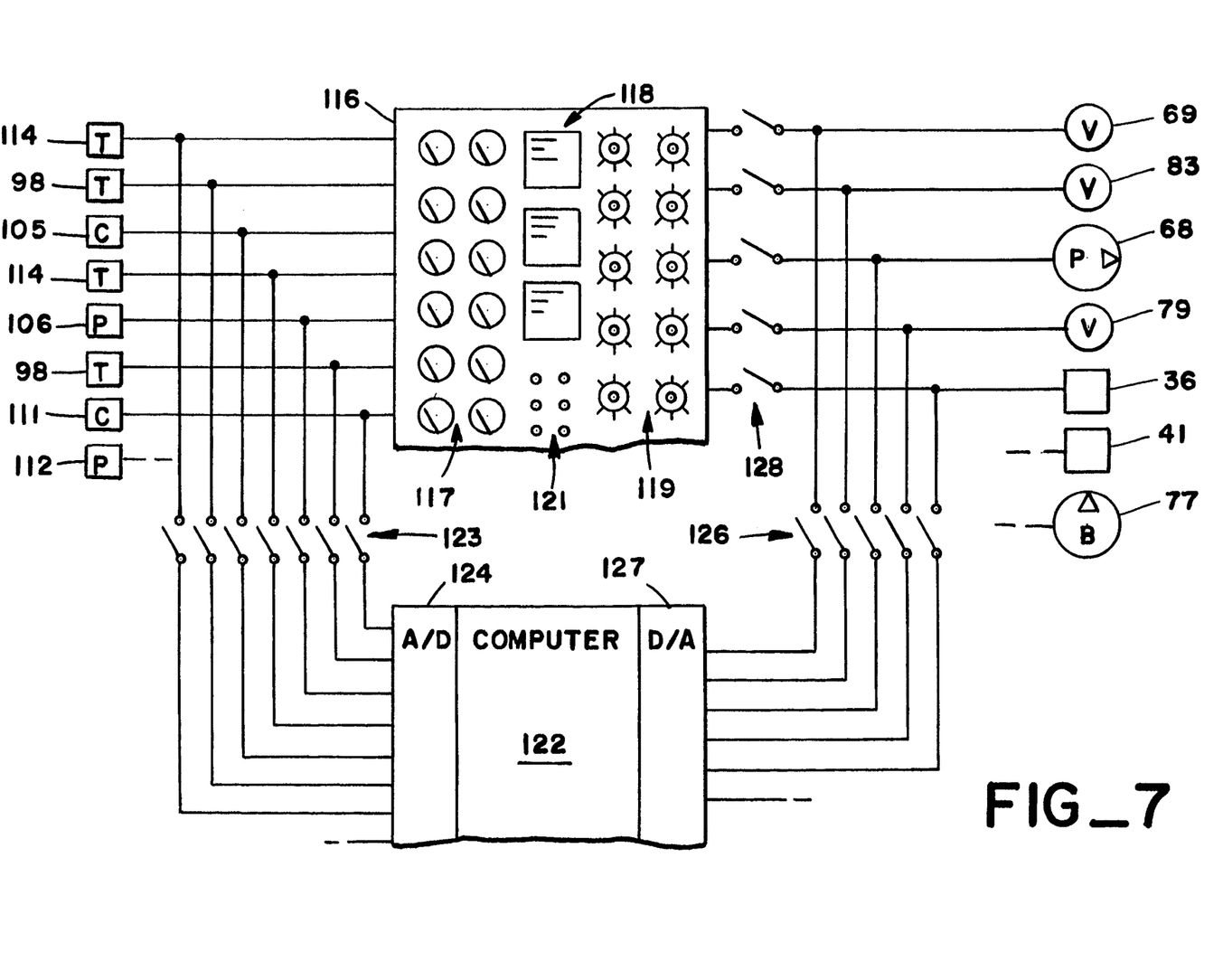
FIG. 7 is a schematic diagram of control system components of the waste destructor apparatus of the preceding figures.

Referring now to FIG. 7, the electrical signals produced by the above described sensors may be transmitted to a central control center or console 116 which has dial indicators 117 or the like and gas composition display screens 118 at which the sensed process conditions can be monitored by an operator. Control console 116 may include the control knobs 119 and switches 121 for actuating and adjusting the electrically controlled pumps, valves and the like which have been previously described.

The information which is provided by the above described monitoring devices at a central control center enables operation of the system to be controlled by a digital computer 122 which can be programmed to continually monitor the temperatures, pressures, water levels, ash levels and gas compositions and to activate, deactivate and adjust the electrical control signals as needed to accommodate to differing feedstocks and varying process conditions. For this purpose, a first series of switches 123 may be closed to transmit the output signals from the monitoring devices to computer 122 through a multi-channel analog to digital signal converter 124. A second series of switches 126 may be closed to transmit control signals that are determined by the computer 122 to the various electrically controlled pumps, valves and the like. The digital control signals generated by computer 122 may be converted to control voltages by a multi-channel digital to analog signal converter 127. An additional series of switches 128 may be opened to isolate the pumps, valves and the like from the manual controls when the system is under computer control.

Referring again to FIG. 6, in operation the primary chemical reaction taking place in the reactor vessel 12 is the so called "water gas reaction", written in chemical terminology as follows:

$$C + H_2O = CO + H_2 \qquad [I]$$

The chemical bond strength of carbon to oxygen in carbon monoxide is more than three times the strength of the carbon to hydrogen bond or the carbon to carbon bond or the oxygen to hydrogen bond. As a result, the reaction proceeds to a very high degree of completion and at a very fast rate at temperatures above about 1200° C. At temperatures above about 1400° C., the reaction goes for all practical purposes to completion with or without catalysts. The reaction rate is such that each carbon atom on the surface of a block of carbon (such as coal, coke or charred wood) lasts less then a hundredth of a second in the atmosphere of superheated steam. A representative chunk of feedstock which has been chopped into small pieces as previously described turns completely into gas in one or two seconds. The same chemistry applies to any carbohydrate type material, such as wood, paper and most food materials for example.

This enables a very high, continuous throughput of feedstock and production of high quality fuel gas at a very high rate. A waste destructor 11 having a reactor vessel 12 that is eight feet in height and which has a five foot outside diameter can process from about 50 tons to about 150 tons of feedstock material in a twenty four hour time period, depending on the composition of the feedstock.

The chemically reducing atmosphere reduces many other chemical elements that may be present in the feedstock and removes toxic materials from the feedstock as the reactions proceed. For example sulfur, sulfur dioxide (and sulfites) and sulfur trioxide (and sulfates) are reduced to sulfides. Iron is either present in the feedstock material or may be added and will react with the sulfide in the reducing atmosphere to form iron sulfide. If mercury is present, it will react with the sulfide to form mercuric sulfide. Thus sulfur dioxide, sulfur trioxide and many other environmentally obnoxious substances will not be formed. The iron sulfide and mercuric sulfide, along with other inorganic solids that result from the presence of other chemical elements in the feedstock, for the granulated residue that is removed by the ash remover 31. These residues can, if desired, be processed by known techniques to salvage useful constituents, such as metals for example.

The product of the above discussed chemical reaction is a mixture of carbon monoxide and hydrogen gas known in the art by such names as water gas, synthesis gas and syn gas. During production of such gas, the upper and lower groups of heaters 24 are preferably adjusted to create the same temperature in the upper and lower regions of the reaction chamber 13. This provides an extensive isothermal zone along the gas flow path for enabling the desired reaction to go to completion without refluxing of the gas. As the upper and lower groups of heaters 24 are fed by separate air blowers 76 and 77 and separate fuel control valves 79 and 81, it is also possible to establish a temperature differential along the gas flow path. This can be advantageous for certain variations of the process. For example, it is possible to produce pure hydrogen by initiating a further reaction which is:

$$CO + H_2O = CO_2 + H_2 \qquad [II]$$

In this process, the temperature produced by the upper group of heaters 24 in reactor vessel 12 is reduced relative to the temperature which is produced at the lower region of the reaction chamber by the lower group of heaters. Pump 89 is used to spray water in which CaO (lime) is dissolved into the second heat exchanger 74. This promotes the desired reaction by further reducing temperature and by increasing steam pressure. The lime removes the carbon dioxide and the outflow from the waste destructor becomes molecular hydrogen gas rather than synthesis gas. A solid residue of calcium oxide and calcium carbonate is produced and removed through ash locks 93 which include a third ash lock at the base of cyclone separator 87. As the calcium carbonate is insoluble, the CaO may easily be recovered from the residue for recycling through the second heat exchanger 74.

Figure 8:
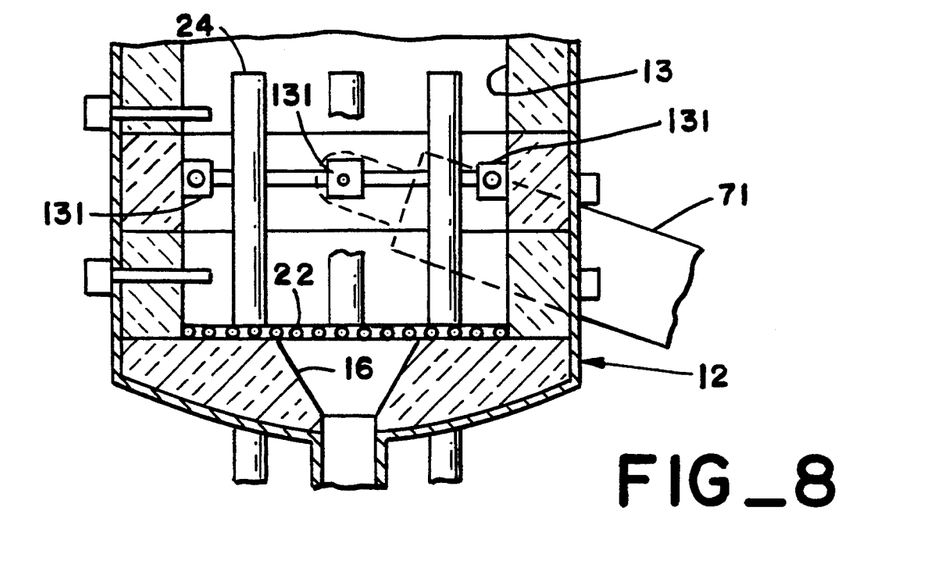
FIG. 8 is a broken out elevation view of the lower region of a modified reactor vessel which is particularly suited for high throughput processing of liquid wastes.

In instances where the feedstock is entirely in liquid form, such as in the processing of sludge oils for example, throughput can be increased by injecting the feedstock into the reactor vessel 12 in the form of a spray or mist. Referring to FIG. 8, this may be accomplished by replacing the previously described feedstock entry port with one or more spray nozzles 131 or atomizers that receive the pressurized feedstock flow from the first heat exchanger 71.

As is known in the art, synthesis gas can be converted to methanol by initiating the following chemical reaction:

$$CO + 2H_2 \underset{}{\overset{Cu}{\rightleftarrows}} CH_3OH \qquad [III]$$

Methanol is a clean burning fuel of much interest in connection with reducing pollution production by gasoline powered engines. Methanol having a purity of 99.85% can be intermixed with gasoline in the ratio: 85% methanol and 15% gasoline and the resultant mixture may be used in place of gasoline. Alternately, methanol is used as a feedstock to produce Methyl-Tertiary-Butyl-Ether (MTBE) which is then added to gasoline.

Water contamination has been a major problem in the commercial production of methanol by this chemical reaction. Substantially pure methanol can be produced by using a waste destructor 11 of the herein described type as the source of the synthesis gas because of the purity of the gas itself that can be produced by the destructor.

Figure 9:
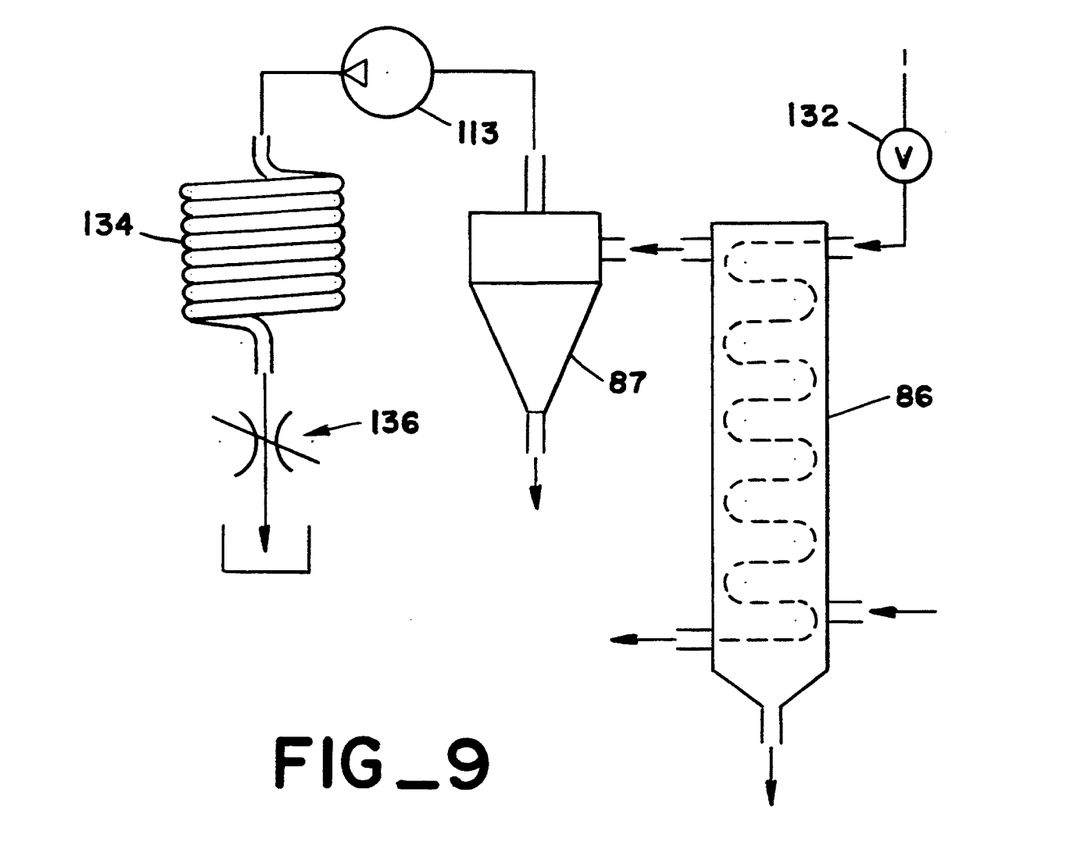
FIG. 9 is a schematic diagram showing additional components which can be used to convert the synthesis gas to highly pure methanol.

For this purpose, with reference to FIG. 9, the flow of cooling water through the third heat exchanger 86 may be adjusted with a flow control valve 132 to cause the temperature of the gas outflow from cyclone separator 87 to be at a value appropriate for the methanol production process which temperature may, for example, be about 700° C. A compressor 133 pressurizes the gas flow to a pressure of about two atmospheres, for example. The hot, pressurized gas flow is then exposed to metallic copper, such as by passage through a coiled copper tube 134, to cause methanol production by the above described reaction III. A variable flow restriction 136 at the outlet of tube 134 enables adjustment of the pressure within the tube.

Further examples of materials which will be efficiently destroyed by the apparatus include rubber tires, organic plastics such as polyvinyl chlorides including baby diapers, most carbonaceous toxic materials such as pure or diluted PCBs, mixtures of solvents and oils, pesticides and herbicides such as agent orange, hospital wastes and sewage sludge. The waste destructor 11 can be adapted to operate as a raw sewage disposal plant.

While the invention has been disclosed with respect to a single embodiment for purposes of example, many modifications and variations are possible and it is not intended to limit the invention except as defined in the following claims.

We claim:

1. In apparatus for destroying carbonaceous waste materials by conversion of said materials to combustible gas and inorganic residue, said apparatus having a reactor vessel with an internal reaction chamber forming a vertically extending gas flow path and having a feedstock inlet port and a gas outlet port, means for directing a flow of said waste material into said reaction chamber, means for creating a chemical reducing atmosphere in said reaction chamber by inhibiting entry of oxygen gas into said reaction chamber, and heating means for heating the contents of said chamber, the improvement comprising:

said heating means having a plurality of recuperative fuel burning heaters extending within said internal reaction chamber and which produce products of combustion of their burnt fuel and which exhaust said products of combustion outside of said internal reaction chamber, said heaters having heat transfer surfaces which are situated within said reaction chamber at said gas flow path, wherein said heat transfer surfaces contact said gas flow path at a plurality of progressively higher locations within said chamber and transfer heat to the contents of said reactor vessel at a plurality of locations along said gas flow path to provide a vertically extended waste material decomposition zone within said reactor vessel.

2. The apparatus of claim 1 wherein said heaters include at least one lower heater situated at a first location along said flow path and at least one upper heater situated at a second spaced apart higher location along said flow path.

3. The apparatus of claim 2 further including means for varying the heat output of said upper heater independently of the heat output of said lower heater.

4. The apparatus of claim 2 further including means for varying the heat output of said lower heater independently of the heat output of said upper heater.

5. The apparatus of claim 1 wherein said heaters have an elongated configuration and extend in parallel relationship with said gas flow path.

6. The apparatus of claim 1 wherein said internal reaction chamber has a lower region and an upper region through which said gas flow path extends and wherein said heating means includes a first plurality of said recuperative heaters extending into said lower region of said reaction chamber and a second plurality of said recuperative heaters extending into said upper region of said reaction chamber, said heaters of said first plurality thereof being equidistantly spaced apart from the center of said gas flow path and being disposed at substantially equal angular intervals around the center of said gas flow path, said heaters of said second plurality thereof also being equidistantly spaced from said center of said gas flow path and being disposed at substantially equal angular intervals around the center of said gas flow path.

7. The apparatus of claim 6 wherein said heaters of said first and second pluralities thereof are elongated in the vertical direction and are spaced apart from each other.

8. The apparatus of claim 6 wherein said reactor vessel has a cylindrical side wall bounding said reaction chamber and wherein said heaters of said first plurality thereof are equidistantly spaced from said side wall and said heaters of said second plurality thereof are also equidistantly spaced from said side wall.

9. The apparatus of claim 6 wherein said gas outlet port is situated at the top of said reaction chamber and at said center of said gas flow path.

10. The apparatus of claim 1 further including a plurality of sensor probes each of which extends into said reactor vessel and each of which has a first end situated within said gas flow path and a second end which is accessible from the exterior of said reactor vessel and having a gas extraction passage which extends between said ends of the sensor probe, said first ends of said sensor probes being spaced apart in the vertical direction, and means for analyzing the composition of gas which is extracted through the passages.

11. The apparatus of claim 10 wherein each of said sensor probes further includes means for detecting the temperature of the gas which is adjacent said first end of the sensor.

12. The apparatus of claim 1 further including a plurality of sensor probes which extend into said reactor vessel and which have first ends situated at vertically spaced apart locations along said flow path, each of said sensor probes having a tubular member which extends from said first end thereof to a second end thereof, each of said sensor probes having an infrared energy detector which has a photosensitive component situated in the path of infrared energy which enters said first end of said tubular member and having an infrared transmissive lens in said tubular member that is positioned to focus infrared energy towards said photosensitive component and further having a disk which extends transversely within said tubular member at a location which is between said first end thereof and said lens, said disk being formed of infrared opaque material and having an infrared transmissive aperture therein, said disk being positioned to block passage of infrared energy along said passage except for infrared energy that is directed towards said lens, said tubular member further having a gas passage which extends longitudinally therein from said first end thereof to a location outside said vessel whereby gas may be extracted from said reaction chamber and be analyzed.

13. The apparatus of claim 1 further including an output gas duct coupled to said gas outlet port and wherein said recuperative heaters each have a fuel inlet and an air inlet, further including means for supplying an air flow to each air inlet and means for transferring heat from said output gas to said air flows.

14. The apparatus of claim 13 wherein said heating means includes a first group of said recuperative heaters situated at a lower region of said reaction chamber and a second group of said recuperative heaters situated at an upper region of said reaction chamber, further including means for varying the air flows to said first and second groups of heaters independently of each other.

15. The apparatus of claim 1 further including first means for intermixing liquid water with said waste materials prior to entry of said waste materials into said feedstock inlet port.

16. The apparatus of claim 15 further including second means for directing additional water into said feedstock inlet port independently of said first means.

17. The apparatus of claim 15 further including means for transferring heat from said combustion products of said recuperative heaters to said waste products and the intermixed water prior to entry of said waste products and water into said feedstock inlet port.

18. The apparatus of claim 1 further including a waste material pump, a first heat exchanger forming a waste material flow path from said pump to said feedstock inlet port and having means for transferring heat from combustion products of said recuprative heaters to said waste material flow path, means for directing a flow of pressurized air to said recuperative heaters, a second heat exchanger forming an output gas flow path for gas which is produced in said reactor vessel and having means for transferring heat from said output gas to said flow of pressurized air.

19. The apparatus of claim 18 further including means for injecting chemical reactants into said output gas within said second heat exchanger and means for removing solid residues from said second heat exchanger.

20. The apparatus of claim 18 further including control means for varying flow rates at predetermined locations in said apparatus, a control center having means for receiving electrical sensor signals indicative of gas compositions and pressures and temperatures at predetermined locations in said apparatus and having means for transmitting electrical control signals to said control means, sensing means for detecting gas compositions and temperatures at a plurality of vertically spaced apart locations within said reaction chamber and for transmitting electrical signals indicative of said gas compositions and temperatures to said control center.

21. The apparatus of claim 1 wherein said reactor vessel has an outer shell and an inner lining of refractory material, and wherein said apparatus further includes means for monitoring the temperature of the outer shell of the vessel at a plurality of spaced apart locations on the shell which means includes an array of spaced apart temperature sensing devices disposed at said outer shell of said vessel.

22. The apparatus of claim 1 wherein said reactor vessel has a bottom region with a porous grate thereat, said grate being below said feedstock inlet port in position to intercept and support solids in said flow of waste material that drop from said feedstock inlet port, and further including means for introducing steam into said reactor vessel at a location which is below said grate.

23. The apparatus of claim 1 wherein said reactor vessel has an ash outlet port at the base thereof for removing said inorganic residue from said reaction chamber further including an ash remover disposed below said ash outlet port, and said ash remover having a housing with an ash storage chamber therein and an ash inlet at the top of said storage chamber and an ash discharge opening at the bottom of said storage chamber, a first valve situated between said ash inlet of said storage chamber and said ash outlet port of said reactor vessel, an ash conduit forming an ash flow passage from said ash outlet port to said first valve, a second valve situated below said ash discharge opening of said storage chamber and being communicated therewith, control means for temporarily closing said first valve and temporarily opening said second valve, first water injection means for filling at least a portion of said ash conduit with water when said second valve is closed and second water injection means for directing a flow of water into said ash storage chamber when said second valve is open to flush the contents of said storage chamber therefrom.

24. The apparatus of claim 23 further including an ash sensor situated below said reaction chamber and having a sub-housing secured to said ash remover which sub-housing has a downwardly directed passage therein that communicates with an upper region of said ash storage chamber, a plunger in said housing which is slidable along said passage between a first position at which said plunger is retracted from said storage chamber and a second position at which said plunger extends into said storage chamber, means for biasing said plunger towards said first position thereof, means for periodically urging said plunger towards said second position thereof, and means for generating and transmitting a signal when said plunger reaches said second position thereof.

25. The apparatus of claim 24 wherein said means for biasing said plunger towards said first position thereof includes a spring acting against said plunger, said means for periodically urging said plunger towards said second position thereof includes an electrical solenoid coil and said means for generating and transmitting a signal includes an electrical contact carried by said plunger and an electrical terminal positioned to be contacted by said contact as said plunger approaches said second position thereof.

26. The apparatus of claim 1 wherein said means for directing a flow of waste material into said reaction chamber sprays liquid components of said waste material into said reaction chamber.

27. The apparatus of claim 1 further including means for converting said combustible gas to methanol.

28. The apparatus of claim 27 wherein said means for converting said combustible gas to methanol directs a hot pressurized flow of said gas into contact with metallic copper.

29. In a method for converting carbonaceous waste materials into combustible gas and inorganic residue which includes the step of directing a flow of said waste material along a vertical flow path within a sealed chamber while subjecting said flow to a heated chemically reducing atmosphere in the presence of steam, the improvement comprising:
   burning fuel in a heater located within the interior of said chamber to heat said waste material and wherein said burning produces combustion products,
   isolating said flow of waste material within said chamber from the combustion products of the burning fuel, and
   directly transferring heat produced by the burning fuel to said flow of waste material within said chamber at a lower region of the flow path and also at a higher region thereof to provide a waste decomposition zone along the vertical flow path that is of sufficient length to substantially fully decompose said waste material during a single passage of said material along said flow path.

30. The method of claim 29 including the further step of independently controlling the temperatures at said lower and higher regions of said flow path.

31. The method of claim 29 including the further step of producing said steam by intermixing liquid water with said waste material prior to entry of said waste material into said chamber.

32. The method of claim 29 including the further step of initiating gasification of said waste materials prior to entry of said waste materials into said reaction chamber by using said combustion products to heat said waste material prior to entry of said waste material into said chamber.

33. The method of claim 29 including the further steps of providing a flow of air to said burning fuel to support combustion thereof and transferring heat from said combustible gas to said flow of air.

34. The method of claim 33 including the further steps of supplying separate air flows to burning fuel at said lower and upper regions of said flow path and separately varying the rates of air flow to said burning fuel at said upper and lower regions of said flow path to create a temperature differential therebetween.

35. The method of claim 29 including the further steps of monitoring the temperature and composition of the gas at a plurality of vertically spaced apart locations within said chamber to enable adjustment of process conditions to accommodate to different waste material compositions.

36. The method of claim 29 including the further step of introducing steam into said sealed chamber at a location which is below said waste decomposition zone.

37. The method of claim 29 including the further step of releasing liquid components of said waste material into said sealed chamber in the form of a spray.

38. The method of claim 29 including the further step of converting an outflow of combustible gas from said chamber into substantially pure methanol.

* * * * *